United States Patent [19]

Lambotte

[11] Patent Number: 5,877,249
[45] Date of Patent: Mar. 2, 1999

[54] TIRE WITH TREAD HAVING SILICA REINFORCEMENT FIELD

[75] Inventor: Jean-Paul Lambotte, Arlon, Belgium

[73] Assignee: The Goodyear Tire & Rubber Company, Akron, Ohio

[21] Appl. No.: 822,380

[22] Filed: Mar. 20, 1997

Related U.S. Application Data

[63] Continuation of Ser. No. 532,349, Sep. 22, 1995, abandoned.

[51] Int. Cl.⁶ .............................. C08K 3/36; C08K 3/04; C08L 9/00
[52] U.S. Cl. ...................... 524/493; 524/492; 524/525; 524/526; 152/209 R; 525/237
[58] Field of Search ................................. 524/492, 493, 524/525, 526; 152/209 R

[56] References Cited

U.S. PATENT DOCUMENTS

| | | | |
|---|---|---|---|
| 4,487,892 | 12/1984 | Ohmori et al. | 525/237 |
| 4,519,430 | 5/1985 | Ahmad et al. | 152/209 R |
| 5,087,668 | 2/1992 | Standstrom et al. | 525/237 |
| 5,422,403 | 6/1995 | Hsu et al. | 525/342 |

*Primary Examiner*—David Buttner
*Attorney, Agent, or Firm*—Henry C. Young, Jr.

[57] ABSTRACT

The invention relates to a tire with a tread which is reinforced with carbon black and precipitated silica where the tread rubbers are of a blend comprised of at least one diene-based elastomer and a styrene/alphamethylstyrene resin, as hereinafter described.

4 Claims, No Drawings

TIRE WITH TREAD HAVING SILICA REINFORCEMENT FIELD

This is a Continuation of application Ser. No. 08/532,349, filed on Sep. 22, 1995, now abandoned.

FIELD

This invention relates to a tire having a rubber tread composed of at least one diene-based elastomer, a styrene/alphamethylstyrene resin and which is reinforced with reinforcing filler composed of carbon black and precipitated silica.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, rolling resistance, traction and wear.

For various applications utilizing rubber including applications such as tires and particularly tire treads, sulfur cured rubber is utilized which contains substantial amounts of reinforcing filler(s). Carbon black is commonly used for such purpose and normally provides or enhances good physical properties for the sulfur cured rubber. Particulate, precipitated silica is also sometimes used for such purpose, particularly when the silica is used in conjunction with a coupling agent. In some cases, a combination of silica and carbon black is utilized as reinforcing fillers for various rubber products, including treads for tires.

It is important to appreciate that, conventionally, carbon black is considered to be a more effective reinforcing filler for rubber tire treads than silica, if the silica is used without a coupling agent.

Indeed, at least as compared to carbon black, there tends to be a lack of, or at least an insufficient degree of, physical and/or chemical bonding between the silica particles and the rubber elastomers to enable the silica to become a reinforcing filler for the rubber for most purposes, including tire treads, if the silica is used without a coupler. While various treatments and procedures have been devised to overcome such deficiencies, compounds capable of reacting with both the silica surface and the rubber elastomer molecule, generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may generally be composed of a silane which has a constituent component, or moiety, (the silane portion) capable of reacting with the silica surface and, also, a constituent component, or moiety, capable of interacting with the rubber, particularly a sulfur vulcanizable rubber which contains carbon-to-carbon double bonds, or unsaturation. In this manner, then the coupler may act as a connecting bridge between the silica and the rubber and thereby enhances the rubber reinforcement aspect of the silica.

In one aspect, the silane of the coupling agent apparently forms a bond to the silica surface, possibly through interaction with silanol groups on the silica surface, and the rubber interactive component of the coupling agent apparently interacts with the rubber. Usually the rubber interactive component of the coupler is temperature sensitive and may tend to combine with the rubber during the higher temperature sulfur vulcanization of the rubber composition and after the silane group of the coupler has reacted with the silica. However, partly because of typical temperature sensitivity of the coupler, some degree of interaction may occur between the rubber-interaction component of the coupler and the rubber during initial rubber/silica/coupler mixing stage(s) and, thus, prior to the subsequent vulcanization of the rubber composition.

The rubber-interactive reactive group component of the coupler may be, for example, one or more of groups such as mercapto, amino, vinyl, epoxy, and sulfur groups, preferably a sulfur or mercapto moiety and more preferably sulfur.

Numerous coupling agents are taught for use in combining silica and rubber, such as, for example, silane coupling agents containing a polysulfide component, or structure such as, for example, bis-(trialkoxysilyalkyl) organosilane polysulfides containing from 2 to about 8 sulfur atoms in a polysulfide bridge such as, for example, bis-(3-triethoxysilylpropyl)tetrasulfide, trisulfide or disulfide. In the case of the disulfide, if in a high purity form, some free sulfur, or sulfur donor, may desirably be added with the coupler in a rubber mixing step to enhance an overall effect of interaction with the elastomer, or rubber.

For silica reinforced tire treads, U.S. Pat. No. 5,066,721, in its Comparative Test Example 1 in Table 3 (column 15), discloses the use of solution polymerization prepared SBR containing 50 parts silica for a tire tread. Table 4 (column 17) illustrates the tire preparation. U.S. Pat. No. 5,227,425 discloses the use of a solution polymerization prepared SBR which is silica reinforced and in which is preferenced over an emulsion polymerization prepared SBR. U.S. Pat. No. 4,519,430 discloses a silica rich tire tread which contains solution or emulsion SBR, optionally with polybutadiene rubber and/or polyisoprene rubber together with a mixture of silica and carbon black, with silica being required to be a major component of the silica/carbon black reinforcing filler.

Styrene/isoprene/butadiene terpolymer rubbers have been disclosed for use in tire treads. For example, U.S. Pat. No. 5,159,020 discloses such a terpolymer rubber (SIBR) and use thereof in a tire tread composition. It is disclosed therein that such tire tread can be composed of a blend of the SIBR and at least one other rubber such as natural rubber, polybutadiene rubber, styrene/butadiene copolymer rubber, isoprene/butadiene copolymer, styrene/isoprene copolymer, and 3,4-polyisoprene rubber. It is disclosed therein that the blend can contain silicas.

It is intended that all of such aforesaid patents are incorporated herein by reference.

The term "phr" where used herein, and according to conventional practice, refers to parts of a respective material per 100 parts by weight of rubber, or elastomer.

In the description of this invention, the terms "rubber" and "elastomer" where used herein, unless otherwise prescribed, are used interchangeably. The terms "rubber composition", "compounded rubber", and "rubber compound" where used herein, unless otherwise prescribed, are used interchangeably to refer to rubber which has been blended or mixed with various ingredients or materials and such terms are well known to those having skill in the rubber mixing, or rubber compounding, art.

The Tg of a polymer, particularly an elastomer, as used herein unless otherwise prescribed, refers to its glass transition temperature which can conventionally be determined, for example, by a differential scanning calorimeter at a heating rate of 15° C. per minute to an observed transition of the temperature versus time curve. It is understood that such Tg determination is well known to those having skill in such art.

SUMMARY AND PRACTICE OF THE INVENTION

In accordance with this invention, a pneumatic tire is provided having a tread comprised of, based on 100 parts by weight rubber, (A) at least one elastomer selected from polymers and copolymers of isoprene and 1,3-butadiene and copolymers of isoprene and/or 1,3-butadiene with styrene or alphamethylstyrene, (B) about 1 to about 26, preferably about 4 to about 16, phr of a styrene/alphamethylstyrene copolymer resin wherein said resin is composed of about 10 to about 70 percent units derived from styrene and, correspondingly, about 60 to about 30 percent units derived from alphamethylstyrene and has a softening point according to ASTM No. E-28 in a range of about 80° C. to about 145° C., (C) reinforcing filler in a range of about 50 to about 120 phr composed of carbon black and precipitated silica, wherein said filler contains about 10 to about 100, alternatively about 15 to about 75, phr of silica and wherein said silica is present in a weight ratio of said silica to carbon black of at least about 1/5, alternatively at least about 1/3 or up to about 10/1, and alternatively in a range of about 1/3 to about 4/1, or in a range of about 1.1/1 to about 10/1, and (D) at least one silica coupler having a moiety reactive with the surface of said silica and a moiety interactive with said rubber. In practice, it is usually desired that a weight ratio of silica to silica coupler is in a range of about 5/1 to about 15/1.

In one aspect of the practice of this invention, it is contemplated that (i) silica in an amount of about 25 to about 40 phr with corresponding amounts of carbon black in a range of about 25 to about 45 phr can be used or (ii) silica in an amount of about 40 to about 80 phr with corresponding amounts of carbon black in a range of about 20 to about 60 phr can be used.

Representative of the various elastomers are, for example, cis 1,4-polyisoprene as natural or synthetic rubber, cis 1,4-polybutadiene rubber, 3,4-polyisoprene rubber, isoprene/butadiene copolymer rubber, styrene/butadiene copolymer rubber of the emulsion polymerization prepared copolymers and of the organic solution polymerization prepared copolymers, styrene/isoprene copolymer rubber, medium vinyl polybutadiene rubber having about a 35 to about 50 percent vinyl content, high vinyl polybutadiene rubber having about a 50 to about 75 percent vinyl content, and styrene/isoprene/butadiene terpolymer rubber.

Such styrene/isoprene/butadiene terpolymer (SIBR) elastomers are, for example, such terpolymers characterized by having a Tg within a range of about −60° C. to about 0° C., alternatively within about −45° C. to about −15° C., and by being comprised of about 20 to about 50, alternatively a low range of about 20 to about 30, a mid range of about 27 to about 37 or a high range of about 40 to about 50 weight percent bound styrene, about 3 to about 55, alternatively a low range of about 3 to about 7 or a higher range of about 45 to about 55, weight percent bound isoprene and about 20 to about 68, alternatively a low range of about 20 to about 30, a mid range of about 45 to about 55, or a higher range of about 58 to about 68, weight percent bound butadiene.

Accordingly, an SIBR might be composed of (A) about 20 to 30 weight percent styrene, about 45 to about 55 weight percent isoprene and about 20 to about 30 weight percent butadiene; (B) about 27 to 37 weight percent styrene, about 3 to about 7 weight percent isoprene and about 58 to 68 weight percent butadiene or (C) about 40 to 50 weight percent styrene, about 3 to about 7 weight percent isoprene and about 45 to 55 weight percent butadiene.

In one aspect of the invention, the elastomers may be composed of a blend of, for example, about 70 to about 100, preferably about 75 to about 90, phr of said styrene/isoprene/butadiene terpolymer rubber and, correspondingly, up to about 30, preferably about 25 to about 10, phr of at least one elastomer selected from cis 1,4-polybutadiene rubber and cis 1,4-polyisoprene natural rubber.

The utilization of the styrene/isoprene/butadiene terpolymer (SIBR) or blend of the SIBR with cis 1,4-polybutadiene rubber and/or cis 1,4-polyisoprene natural rubber is considered herein to be an important aspect of the invention designed to enhance properties of a tire tread containing both carbon black and silica reinforcement in combination with the styrene/alphamethylstyrene copolymer resin.

The styrene/alphamethylstyrene resin is an important aspect of the invention. It is considered that, in one aspect, its glass transition temperature (Tg) characteristic combined with its molecular weight (Mn) and molecular weight distribution (Mw/Mn) provides a suitable compatibility of the resin in the rubber polymer blend, the degree of compatibility being directly related to the nature of the rubber polymer blend.

The presence of the styrene/alphamethylstyrene resin with a rubber blend which contains the presence of the styrene/isoprene/butadiene terpolymer elastomer is considered herein to be beneficial because of observed viscoelastic properties of the tread rubber composition such as complex and storage modulus, loss modulus tan.delta and loss compliance at different temperature/frequency/strain as hereinafter generally described.

The properties of complex and storage modulus, loss modulus, tan.delta and loss compliance are understood to be generally well known to those having skill in such art. They are hereinafter generally described.

The molecular weight distribution of the resin is visualized as a ratio of the resin's molecular weight average (Mw) to molecular weight number average (Mn) values and is considered herein to be in a range of about 1.5/1 to about 2.5/1 which is considered to be a relatively narrow range. This believed to be advantageous because of the selective compatibility with the polymer matrix and because of a contemplated use of the tire in wet and dry conditions over a wide temperature range.

The Tg of the copolymer resin is considered herein to be in a range of about 30° C. to about 100° C., alternatively about 30° C. to about 80° C., depending somewhat upon an intended use of the prepared tire and the nature of the polymer blend for the tire tread.

The styrene/alphamethylstyrene resin is considered herein to be a relatively short chain copolymer of styrene and alphamethylstyrene with an optimized styrene/alphamethylstyrene molar ratio in a range of about 0.40 to about 1.50. In one aspect, such a resin can be suitably prepared, for example, by cationic copolymerization of styrene and alphamethylstyrene in a hydrocarbon solvent.

Thus, the contemplated styrene/alphamethylstyrene resin can be characterized, for example, by its chemical structure, namely, its styrene and alphamethylstyrene contents and softening point and also, if desired, by its glass transition temperature, molecular weight and molecular weight distribution.

The styrene/isoprene/butadiene terpolymer rubber (SIBR) can be suitably prepared by solution polymerization and is preferably characterized by a Tg of about −20° C. to about −45° C. An example of such a terpolymer rubber is disclosed in U.S. Pat. No. 5,159,020 which is specifically incorporated herein by reference.

The cis 1,4-polybutadiene rubber (BR) is considered to be beneficial, in one aspect, to enhance the tire tread's wear, or treadwear.

Such BR can be prepared, for example, by organic solution polymerization of 1,3-butadiene.

The BR may be conventionally characterized, for example, by having at least a 90% cis 1,4-content.

The cis 1,4-polyisoprene natural rubber is well known to those having skill in the rubber art.

Thus, in the practice of this invention, a rubber tread is provided which can rely upon the SIBR terpolymer rubber backbone, the inclusion of the styrene/alphamethylstyrene resin, and a filler reinforcement composed of carbon black and silica which, in turn, relies on a silica coupler for the silica's reinforcing effect for the rubber blend.

In one aspect, the tread rubber blend can require the presence of both a solution polymerization prepared rubber (the SIBR) as well as the styrene/alphamethylstyrene copolymer resin of the prescribed physical characteristic(s), namely, the styrene and alphamethylstyrene contents and the softening point. This is considered significant because it is considered herein that the combination of the SIBR and the resin aids in providing a tire tread composition which has (i) a maximized tan.delta, and usually also loss modulus G", at a temperature between −25° C. and 0° C. and a tuned value of the complex (dynamic) modulus (G*) which can enhance both the tread pattern stability under deformation and the loss compliance factor which is related to pure traction, as relates to tire rotational acceleration and braking. The loss and storage modulii can be determined, for example, by dynamic rubber property determination apparatus well known to those having skill in such art.

The viscoelastic properties of a compounded rubber blend, for a tire tread application, are considered herein as being important. For example, a tan.delta property is the ratio of the viscous contribution to the elastic contribution for a viscoelastic rubber subjected to a dynamic deformation. Such properties are typically represented in a form of a curve(s) as a plot of tan.delta values (and/or G' and/or G" values) versus temperature.

For a tire with good wet skid resistance, a tread rubber with a tan.delta maximization (a maximization of a tan.delta value of a tan.delta vs temperature curve) is desired in a temperature range, or region, of about −25° C. to about +10° C. For a tire with good handling and mainly dry handling, a tread rubber with a G* complex dynamic modulus optimized in a G* vs temperature curve, in a temperature range, or region, of 25° C. to 75° C. The higher the G* in this temperature range for the tire tread composition, predictively, the better the cornering stability of the tire, other things being equal. The lower the G* for the tread rubber composition in a temperature range, or region, of about −25° C. to about 10° C., predictively, the higher the skid resistance of the tread, other things being equal. It is believed that these values and relationships are well known to those skilled in such art.

The term "tan.delta maximization" means, in general, a maximization of the rubber composition's hysteresis at a given temperature range. In general, it is desirable to have the G* as low as reasonably possible at the aforesaid corresponding temperature range and the tan.delta as high as reasonably possible at the aforesaid corresponding temperature range to achieve the aforesaid properties.

The terms "loss modulus, or G", storage or dynamic modulus, or G', complex modulus, or G*, loss compliance and tan.delta" are well known to those having skill in the rubber composition characterization art, particularly to those having skill in evaluating rubber compositions for use as pneumatic tire tread applications.

It is considered herein that the styrene/alphamethylstyrene resin contributes to the aforesaid tire tread composition by tending to increase tan.delta curve of the compound in the range of about 0° C. to about −20° C. while maintaining a good dynamic, or storage, modulus (G') at a higher temperature range of about +25° C. to about +100° C.

In the practice of this invention, various rubber reinforcing carbon blacks can be used. Representative of such blacks, although these examples are not intended to be limitive, are of the ASTM designation type N-299, N-234, N-220, N-134, N-115 and N-110. While the selection of carbon black is not considered herein to be critical in the preparation of a tire tread, carbon blacks of the N-234, N-220 and N-134, for example, may be generally preferred herein to provide for, or to promote, tire tread traction and wear resistance purposes.

A combination of carbon black and silica (with a silica coupler being used with the silica) as rubber reinforcements is considered herein as being beneficial for the tire tread, particularly for the SIBR and rubber/styrene-alphamethylstyrene resin combination for a purpose of enhancing the tire's wet and dry traction maintaining tread's rolling resistance (reducing the tire's resistance to rolling and, thus, enhancing its value for vehicular fuel economy) and substantially maintaining the tire tread's treadwear as compared to a tread without silica reinforcement (but with carbon black reinforcement) and without the aforesaid resin.

The commonly employed siliceous pigments used in rubber compounding applications can be used as the silica in this invention, including pyrogenic and precipitated siliceous pigments (silica), although precipitate silicas are preferred The siliceous pigments preferably employed in this invention are precipitated silicas such as, for example, those obtained by the acidification of a soluble silicate, e.g., sodium silicate.

The siliceous pigment (silica) may typically have a BET surface area of the pigment, as measured using nitrogen gas, in a range of about 100 to about 280 or even up to about 360, alternatively about 120 to about 250, square meters per gram The BET method of measuring surface area is described in the *Journal of the American Chemical Society*, Volume 60, page 304 (1930).

The silica may also typically have a dibutylphthalate (DBP) absorption value in a range of about 150 to about 400, and more usually about 200 to about 300.

Various commercially available silicas may be considered for use in this invention such as, for example, only and without limitation, silicas commercially available from PPG Industries under the Hi-Sil trademark such as, for example, those with designations 210, 243, etc; silicas available from Rhone-Poulenc, with designations such as Zeosil 1165MP and silicas available from Degussa AG with designations such as VN2 and VN3, etc. The Rhone-Poulenc Zeosil 1165MP silica is reportedly characterized by having a BET surface area of about 160–170 and by a DBP value of about 250–290 and by having a substantially spherical shape.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical additions of carbon black, for this invention are hereinbefore set forth. Typical amounts of tackifier resins, if used, comprise about 0.5 to about 10 phr, usually about 1 to about 5 phr. Typical amounts of processing aids comprise about 1 to up to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to about 5 phr. Typical amounts of fatty acids, if used, which can include stearic acid, comprise about 0.5 to about 5 phr. Typical amounts of zinc oxide comprise about 2 to about 5 phr. Typical amounts of waxes comprise about 1 to about 5 phr. Often microcrystalline waxes are used.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the arts sulfur vulcanizing agents are used in an amount ranging from about 0.5 to about 4 phr, or even, in some circumstances, up to about 8 phr, with a range of from about 1.0 to about 2.5, sometimes from 1 to 1.5, being preferred.

Accelerators are used to control the time and/or temperature required for vulcanization and to improve the properties of the vulcanizate. Retarders are also used to reduce the rate of vulcanization. In one embodiment, a single accelerator system may be used, i.e., primary accelerator. Conventionally and preferably, a primary accelerator(s) is used in total amounts ranging from about 0.5 to about 6, preferably about 1.8 to about 5.0, phr. In another embodiment, combinations of a primary and a secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention, unless otherwise noted hereinbefore, which is more primarily directed to the utilization of specified blends of rubbers in tire treads, in combination with the styrene/alphamethylstyrene resin, silica and silica coupler and carbon black.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Rubber compositions (compounded rubber) were prepared of blends of styrene/isoprene/butadiene terpolymer rubber (SIBR) with natural cis 1,4-polyisoprene rubber and of SIBR with natural cis 1,4-polyisoprene rubber and cis-1,4-polybutadiene rubber, both together with a styrene/alphamethylstyrene resin plus reinforcing filler composed carbon black and a quantitative amount of silica together with a silica coupler which are referred to herein as Sample X and Sample Z, respectively.

The rubber compositions of Sample X and Sample Z were prepared by mixing the ingredients in several stages, namely, two non-productive stages (without the curatives), two remills and a productive stage (for the curatives), then the resulting composition was cured under conditions of elevated temperature and pressure.

For the non-productive mixing stages, exclusive of the accelerator(s) and sulfur curatives which are mixed (added) in the final, productive mixing stage, the polymers, the silica, the coupling agent and approximately half of stearic acid and processing oil are mixed in the first non-productive mixing stage in a Banbury type internal rubber mixer to a temperature of about 150° C. for about 4 minutes. The next, mixing stage is also in an internal Banbury rubber mixer to a temperature of about 155° C. for about 2 minutes without adding additional materials In a next, sequential mixing stage, the remaining ingredients (except sulfur and curatives) were added and the mixture mixed to a temperature of about 175° C. for about 3 minutes in a Banbury type internal rubber mixer. The following mixing stage is conducted in an internal Banbury mixer to a temperature of about 170° C. for about 2 minutes without adding additional ingredients. The resulting rubber composition (mixture) was then mixed in a final Banbury type internal mixer with the curatives, namely, the accelerator(s) and sulfur, to a temperature of about 120° C. for about 1 minute.

The rubber compositions were comprised of the ingredients illustrated in Table 1.

TABLE 1

| Sample # | X | Z |
|---|---|---|
| Non-Productive Mix Stages | | |
| SIBR[1] | 90 | 85 |
| Styrene/alphamethylstyrene[2] | 9 | 8 |
| BR[3] | | 10 |
| Natural Rubber[4] | 10 | 5 |
| Processing Oil[5] | 38.8 | 36.25 |
| Zinc Oxide | 4 | 4 |
| Fatty Acid | 3.5 | 3.5 |
| Antioxidant[6] | 2.75 | 2.75 |
| Silica[7] | 40 | 40 |
| Carbon Black | 48 | 48 |
| Coupling Agent[8] | 8 | 8 |
| Productive Mix Stage | | |
| Sulfur | 1.40 | 1.40 |
| Sulfenamide and Guanidine Type Accelerators | 4.2 | 4.2 |

[1] the SIBR had a Tg of about −25° C.; and composed of about 25 percent bound styrene, about 50 percent bound isoprene and about 25 bound butadiene;
[2] styrene/alphamethylstyrene resin obtained as Kristalex Res R2336 from the Hercules Inc. company and reportedly having a softening point of about 85° C. and a Tg of about 39° C. and being composed of about 60 percent units derived from styrene and about 40 percent units derived from alphamethylstyrene;
[3] cis 1,4-polybutadiene rubber obtained as Budene ® 1254 from The Goodyear Tire & Rubber Company;
[4] natural rubber (cis 1,4-polyisoprene);
[5] rubber processing oil as being 22.5 parts in SIBR, where the amount of SIBR is reported above on a dry weight (without the oil) and in addition, about 16.3 parts additional rubber processing oil were added;
[6] of the paraphenylene diamine type of antidegradant;
[7] a silica obtained as Zeosil 1165MP from the Rhone-Poulenc company, and reportedly, having a BET surface area of about 165 and a DBP absorption value of about 260–280; and
[8] bis-3-triethoxysilylpropyl)tetrasulfide (50% active) commercially available as X50S from Degussa in a 50/50 blend of the tetrasulfide with N330 carbon black (thus, considered 50% active). Technically, the tetrasulfide is understood to be an organosilane polysulfide as a composite, or mixture, in which the polysulfide bridge contains an average of about 3.5 to about 4 connecting sulfur atoms, although an individual sulfur bridge in the composite or mixture may contain about 2 to about 8 connnecting sulfur atoms.

The rubber compositions were cured, or vulcanized, at a temperature of about 150° C. for about 18 minutes. Similarly, a control rubber composition, identified herein as Sample Y, of 90 phr styrene/isoprene/butadiene terpolymer elastomer and 10 phr of cis 1,4-polyisoprene natural rubber which contained 15 phr of silica with a silica/carbon black ratio of about 1/5 was prepared and cured, or vulcanized.

The physical properties of the vulcanized samples were determined and reported herein in the following Table 2.

TABLE 2

| Sample # | X | Y (Cntrol) | Z |
|---|---|---|---|
| Rheometer (150° C.) | | | |
| Max. Torque | 35.0 | 30.0 | 32.8 |
| Min. Torque | 8.0 | 8.5 | 8.0 |
| $T_{90}$, minutes | 10.2 | 10.4 | 10.2 |
| $T_{25}$, minutes | 6.9 | 8.4 | 7.0 |
| Stress-Strain | | | |
| Tensile Strength, MPa | 14.4 | 13.6 | 14.1 |
| Elongation at Break, % | 400 | 557 | 370 |
| 100% Modulus, MPa | 2.5 | 1.7 | 2.5 |
| 300% Modulus, MPa | 11.75 | 7.3 | 12.0 |
| Rebound | | | |
| 100° C. (%) | 57 | 38.5 | 60 |
| 23° C. (%) | 14.5 | 13.5 | 18 |
| Hardness (Shore A) | | | |
| 23° C. | 65 | 64.5 | 65 |
| Dynamic Mechanical Properties | | | |
| G* Stiffness @ 50° C., MPa | 4.7 | 7.65 | 4.4 |
| Tan.Delta at 50° C. | .078 | .117 | .073 |
| Tan.Delta at 0° C. | .650 | .420 | .560 |
| G* Stiffness at 0° C., MPa | 17.2 | 29.7 | 11.6 |
| Heat Generation (°C.) | 33.8 | 52.5 | 31.3 |

These properties, namely the G* stiffness at 0° C. and tan.delta at 0° C., of the vulcanized rubber compositions are predictive that anticipated traction properties for a tire with a tread of Sample X or of Sample Z, would be superior to those of control Sample Y.

It is considered herein that the inclusion of the styrene/alphamethylstyrene resin in the elastomer composition has contributed to enhance significantly the tan.delta of Sample X and Sample Z in the temperature range from −20° C. to +5° C. as compared to control Sample Y and demonstrated by the dynamic and mechanical properties shown in Table 2.

EXAMPLE II

Pneumatic rubber tires, referred to herein as Tire X and control Tire Y, are prepared of size 225/55R15 steel belted radial ply tires, which have sulfur cured rubber treads composed of the rubber composition of the type corresponding to previously illustrated Sample X and control Sample Y.

The tires were tested with the results shown in Table 3, with the values compared to those of the control Tire Y which have been normalized to values of 100.

TABLE 3

| Tire Properties | X | Y (Control) |
|---|---|---|
| Rolling Resistance | 112 | 100 |
| Wet Handling | 106 | 100 |
| Wet Skid | 106 | 100 |
| Wear | 94 | 100 |
| Dry Handling | 100 | 100 |

The higher wet skid resistance value reported for Tire X, as compared to control Tire Y, is considered herein to indicate a greater tire tread traction and, thus, a greater resistance to skidding under wet conditions.

A higher reported value above for the rolling resistance for Tire X above, as compared to control Tire Y, is considered herein to indicate an improved, or lower, rolling resistance for the tire and, thus, an indication of improved fuel economy for the vehicle.

The higher wear value reported for Tire X, as compared to Tire Y, is considered herein to indicate a slightly higher treadwear, thus, indicating a slightly lower predicted tread life for Tire X. This small decrease in wear performance is considered as minor in comparison with the significant improvement in wet handling and wet skid resistance performance.

Thus, these Examples demonstrate that the aforesaid rolling resistance, wet-to-dry and wet skid resistance for Tire X are considerably improved over the values for the control Tire Y.

It is considered herein that the inclusion of the styrene/alphamethylstyrene resin together with increased level of silica in the elastomer composition has contributed to the improvements in wet handling and wet braking performances without affecting the rolling resistance performance by the increase in tan.delta and loss compliance at 0° C. with no change in tan.delta and loss compliance at 50° C. for rubber compositions demonstrated by Sample X and Sample Z.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread comprised of, based on 100 parts by weight rubber, (A) at least one elastomer selected from polymers and copolymers of isoprene and 1,3-butadiene and copolymers of isoprene and/or 1,3-butadiene with styrene or alphamethylstyrene, (B) about 1 to about 26 phr of a styrene/alphamethylstyrene copolymer resin wherein said resin is composed of about 40 to about 70 percent units derived from styrene and, correspondingly, about 60 to about 30 percent units derived from alphamethylstyrene and has a Tg in a range of about 30° C. to about 80° C. and a softening point according to ASTM No. E-28 within a range of about 80° C. to about 145° C., (C) a reinforcing filler within a range of about 50 to about 120 phr composed of carbon black and precipitated silica, wherein said filler contains (i) about 25 to about 40 phr of silica and about 25 to about 45 phr carbon black or (ii) about 40 to about 80 phr silica and about 20 to about 60 phr of carbon black, and (D) at least one silica coupler having a moiety reactive with the surface of said silica and another moiety interactive with said rubber, wherein the weight ratio of silica to silica coupler is in a range of about 5/1 to about 15/1 wherein, said silica is characterized by having a BET surface area in a range of about 100 to about 360 and a DBP absorption value in a range of about 150 to about 400.

2. The tire of claim 1 where, in said tread, said elastomers are composed about 75 to about 90 phr of styrene/isoprene/butadiene terpolymer rubber and, correspondingly, about 25 to about 10, phr of at least one elastomer selected from cis 1,4-polybutadiene rubber and cis 1,4-polyisoprene natural rubber.

3. The tire of claim 1 where, in said tread, the weight ratio of silica to carbon black is at least 1/3 and said coupler is a bis-(trialkoxysilylalkyl) polysulfide having from 2 to about 8 sulfur atoms in a sulfide bridge.

4. The tire of claim 1, where, in said tread, said elastomer is selected from at least one of cis 1,4-polyisoprene, cis 1,4-polybutadiene, 3,4-polyisoprene, medium to high vinyl polybutadiene having from 35 to 75 percent vinyl content, isoprene/butadiene copolymer, styrene/isoprene copolymer, styrene/butadiene copolymer, and styrene/isoprene/butadiene terpolymer.

* * * * *